United States Patent
Bialas et al.

(10) Patent No.: US 9,249,877 B2
(45) Date of Patent: Feb. 2, 2016

(54) POSITION DIAGNOSTIC TEST FOR A SHIFT-BY-WIRE SYSTEM, AND A METHOD THEREOF

(71) Applicant: GM GLOBAL TECHNOLOGY OPERATIONS LLC, Detroit, MI (US)

(72) Inventors: Daniel A. Bialas, Ann Arbor, MI (US); Anne Bliss, Troy, MI (US); Orson S. Wang, Novi, MI (US); Michael J. Abowd, Ann Arbor, MI (US); Brian A. MacFarlane, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 14/032,502

(22) Filed: Sep. 20, 2013

(65) Prior Publication Data

US 2015/0088387 A1 Mar. 26, 2015

(51) Int. Cl.
  *G01M 17/00* (2006.01)
  *F16H 61/00* (2006.01)
  *G06F 3/033* (2013.01)
  *F16H 61/02* (2006.01)

(52) U.S. Cl.
  CPC .................................. *F16H 61/0213* (2013.01)

(58) Field of Classification Search
  USPC ............... 701/30.3; 74/335; 345/161
  See application file for complete search history.

(56) References Cited

U.S. PATENT DOCUMENTS

| | | | |
|---|---|---|---|
| 2002/0020236 A1* | 2/2002 | Onodera | 74/335 |
| 2008/0028879 A1* | 2/2008 | Robinette et al. | 74/335 |
| 2009/0088291 A1* | 4/2009 | Kumazaki et al. | 477/35 |
| 2009/0199670 A1* | 8/2009 | Ruebsam et al. | 74/473.12 |
| 2010/0060577 A1* | 3/2010 | Wang | 345/161 |
| 2011/0018534 A1* | 1/2011 | Peukert et al. | 324/251 |
| 2012/0095656 A1* | 4/2012 | Pudvay | 701/51 |
| 2013/0151097 A1* | 6/2013 | Deurloo et al. | 701/62 |
| 2014/0136060 A1* | 5/2014 | Deurloo et al. | 701/51 |
| 2015/0088387 A1* | 3/2015 | Bialas et al. | 701/51 |

* cited by examiner

*Primary Examiner* — Thomas G Black
*Assistant Examiner* — Tyler Paige
(74) *Attorney, Agent, or Firm* — Quinn Law Group, PLLC

(57) ABSTRACT

A position diagnostic test for a shift-by-wire system is provided. The shift-by-wire system includes a shift lever configured to move along a shift path, a first and a second position sensor configured to generate a first and a second position signal, respectively, of the shift lever along the shift path, and a controller configured to receive the first and second position signals. The first position sensor includes a first x-coordinate value and a first y-coordinate value, and the second position sensor includes a second x-coordinate value and a second y-coordinate value. The position diagnostic test includes performing a rationality test on each of the coordinate values. If at least one predetermined condition exists for a particular coordinate value, then it fails the rationality test, and the position signal containing the coordinate value may be disregarded.

19 Claims, 2 Drawing Sheets

POSITION DIAGNOSTIC TEST FOR A SHIFT-BY-WIRE SYSTEM, AND A METHOD THEREOF

TECHNICAL FIELD

The present invention relates to a position diagnostic test for a shift-by-wire system of a vehicle, and a method thereof.

BACKGROUND

In a traditional automatic transmission system for a vehicle, a shifter is connected to the transmission by a mechanical linkage to change the gears or ranges of the transmission. The ranges may include, but are not limited to, Park, Neutral, Reverse, and Drive. However, shift-by-wire transmission systems have been developed where the mechanical linkage is replaced by an electronic connection through which an electronic signal is sent to the transmission to effect the changing of the transmission ranges. The electronic signal may be activated via a shift lever, buttons, and the like. In shift-by-wire systems that implement a shift lever, the shift-by-wire systems generally include a position sensor to track the position of the shift lever such that the desired range selection is communicated to the transmission. Some shift-by-wire systems include multiple position sensors to provide redundancy and reliability.

SUMMARY

A shift-by-wire system for a vehicle is provided. The shift-by-wire system includes a shift lever, a first position sensor, a second position sensor, and a controller. The shift lever is configured to move along a shift path between a plurality of range positions that are arranged in shift pattern.

The first position sensor and the second position sensor are configured to generate a first position signal and a second position signal, respectively, each corresponding to a position of the shift lever. The first position signal has a first x-coordinate value and a first y-coordinate value, and the second position signal has a second x-coordinate value and a second y-coordinate value.

The controller is configured to receive the first position signal from the first position sensor and the second position signal from the second position sensor. The controller is also configured to determine if at least one of the first position signal and the second position signal accurately communicates the position of the shift lever.

A position diagnostic test for the shift-by-wire system described above is also provided. The position diagnostic test includes performing a rationality test on each of a plurality of tested coordinate values. These include the first x-coordinate value and the first y-coordinate value of the first position signal, and the second x-coordinate value and the second y-coordinate value of the second position signal. Any one of the tested coordinate values fails the respective rationality test if at least one predetermined condition exists.

A method for determining the position of the shift lever of the shift-by-wire system described above is further provided. The method includes first receiving, by the controller, the first position signal from the first position sensor, and the second position signal from the second position sensor. The method then includes performing a rationality test on each of a plurality of tested coordinate values. As explained above, the tested coordinate values include the first x-coordinate value and the first y-coordinate value of the first position signal, and the second x-coordinate value and the second y-coordinate value of the second position signal. If both of the tested coordinate values that include the first x-coordinate value and the first y-coordinate value pass the respective rationality test, then the method includes determining that the first position signal is accurate. If both of the tested values that include the second x-coordinate value and the second y-coordinate value pass the respective rationality test, then the method includes determining that the second position signal is accurate. As explained above, any one of the tested coordinate values fails the respective rationality test if at least one predetermined condition exists.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
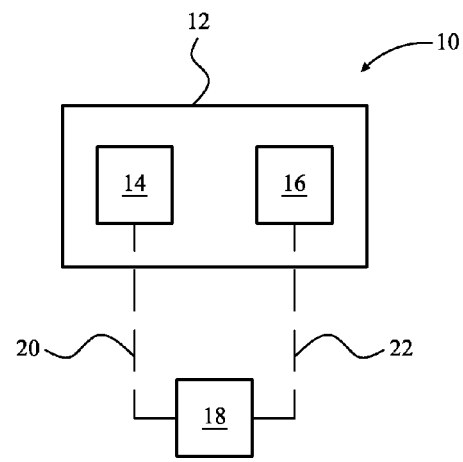
FIG. 1 is a schematic block diagram of a shift-by-wire system of a vehicle.

Referring to the drawings, wherein like reference numbers correspond to like or similar components wherever possible throughout the several figures, a shift-by-wire system 10 for controlling the transmission of a vehicle (not shown) is shown in FIG. 1. The shift-by-wire system 10 generally includes a shift lever 12 that is used to select different transmission ranges, including, but not limited to, Reverse, Neutral, and Drive. The shift-by-wire system 10 may also include a park button or activation device (not shown) to place the vehicle into a Park mode.

Figure 2:
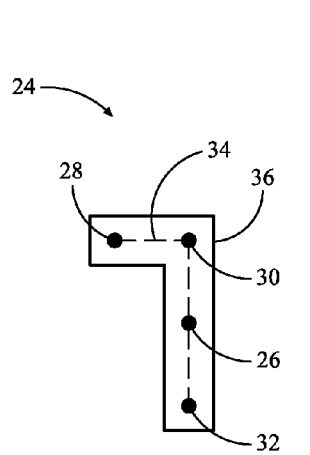
FIG. 2 is a schematic illustration of a shift pattern for a shift lever of the shift-by-wire system of FIG. 1.

A driver of the vehicle generally selects a particular transmission range by moving the shift lever 12 to a position corresponding to the transmission range. As seen in FIG. 2, the positions may include, but are not limited to, a reverse position 28 corresponding to the Reverse range, a neutral position 30 corresponding to the Neutral range, and a drive position 32 corresponding to the Drive range. When the driver releases the shift lever 12, it returns to a null position 26 (or a rest position). The positions 26, 28, 30, and 32 are arranged in a shift pattern 24, and are connected by a shift path 34 along which the shift lever 12 moves. It should be appreciated that the positions 26, 28, 30, and 32 may be arranged in any shift pattern. The shift pattern 24 may include a shifter gate 36, or a zone around the shift path 34 that provides a tolerance for any minimal lateral or longitudinal movement of the shift lever 12 when moving along the shift path 34 such that the position of the shift lever 12 may still be accurately identified, as described in more detail below. The outer limits of the shifter gate 36 may be adjusted and fine-tuned to allow for different tolerances. The shift pattern 24 generally is stored in a controller 18, described below.

The shift-by-wire system 10 also includes a first position sensor 14 and a second position sensor 16 configured to separately determine a first position signal 20 and a second position signal 22, respectively, of the shift lever 12 along the shift path 34. The first position sensor 14 and the second position sensor 16 provide redundant positional tracking of the shift lever 12 to ensure that the transmission range actually selected by the driver of the vehicle is communicated to the transmission in the event that one of the position sensors 14 or 16 fails, as described in more detail below.

Figure 3:
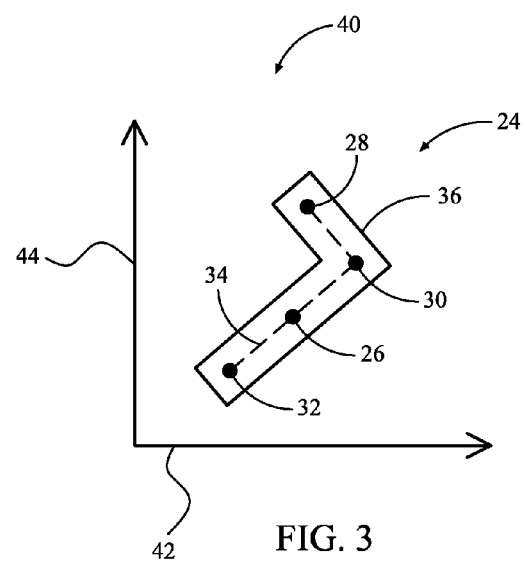
FIG. 3 is a schematic illustration of a position arrangement of a first position sensor and a second position sensor of the shift-by-wire system of FIG. 1 with respect to the shift pattern of FIG. 2.

As seen in FIG. 3, the first position sensor 14 and the second position sensor 16 generally have a position arrangement 40, i.e., a coordinate system with an x-axis 42 and a y-axis 44, with respect to the shift pattern 24. As such, the first position signal 20 includes a first x-coordinate value $x_1$ and a first y-coordinate value $y_1$, and the second position signal 22 includes a second x-coordinate value $x_2$ and a second y-coordinate value $y_2$. The first position sensor 14 and the second position sensor 16, and therefore their respective position arrangement 40, may be oriented at an angle with respect to the shift pattern 24, as depicted in FIG. 3. As a result, any movement of the shift lever 12 along the shift path 34 results in a change in both the x-coordinate value and the y-coordinate value of the first position signal 20 and/or the second position signal 22. This may allow for greater sensitivity of the shift-by-wire system 10 to determine a fault in the first position sensor 14 and/or the second position sensor 16, as explained in more detail below.

The shift-by-wire system 10 further includes the controller 18 mentioned above. The controller 18 is in electrical communication with the first position sensor 14 and the second position sensor 16, and is configured to receive the first position signal 20 from the first position sensor 14, and the second position signal 22 from the second position sensor 16. After receiving the first position signal 20 and the second position signal 22, the controller 18 is configured to determine which, if any, of the two position sensors 16 and 18 are functioning properly, as described in method 100 below, and therefore, which of the two position signals 20 and 22 to use to determine the selected transmission range. The controller 18 may then communicate the selected transmission range to the transmission or to another controller (not shown). The controller 18 may be a dedicated processing device, or may be shared by a number of components as part of a larger system, such as a vehicle electronic module (not shown).

Figures 4, 5:
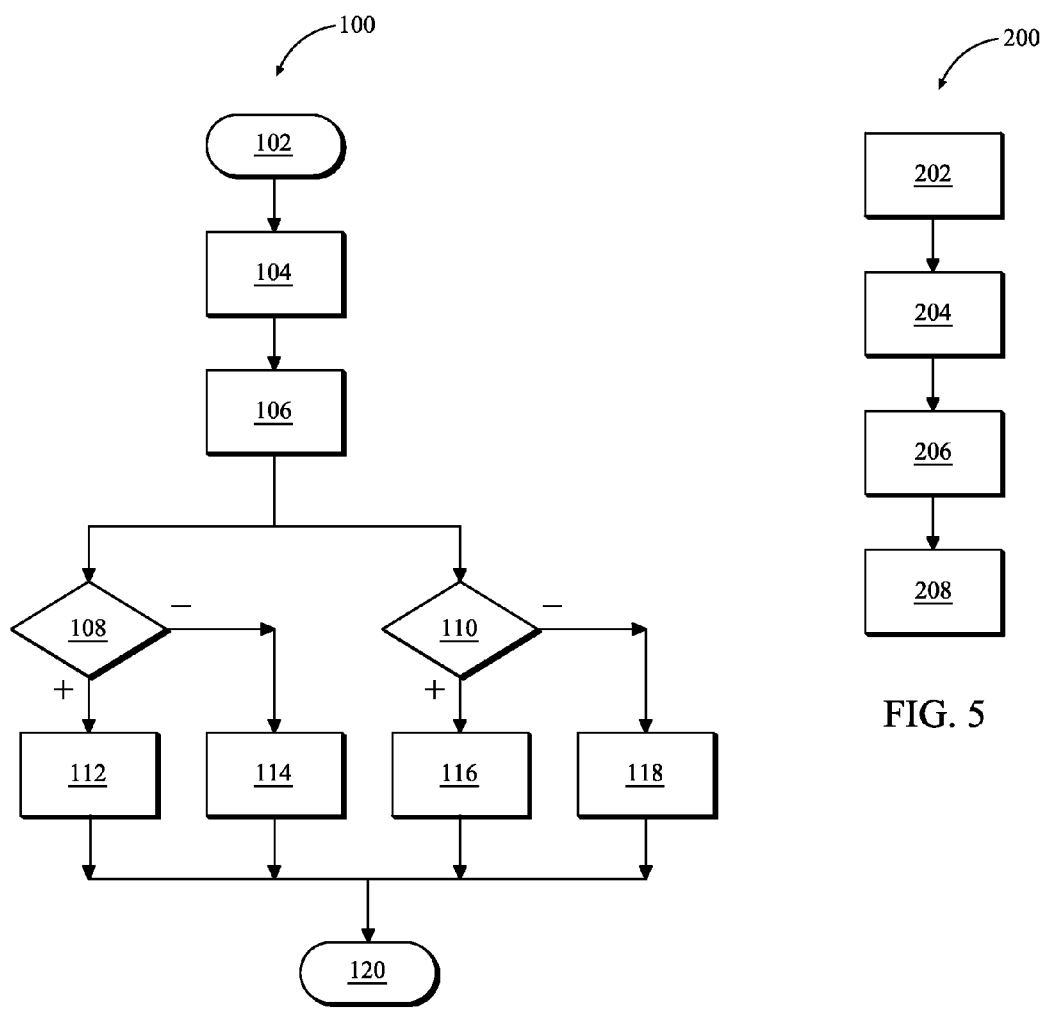
FIG. 4 is a schematic flow diagram illustrating a method of determining a position of a shift lever of the shift-by-wire system of FIG. 1.
FIG. 5 is a schematic flow diagram illustrating a position diagnostic method for the shift-by-wire system of FIG. 1.

Referring now to FIG. 4, a method 100 for determining the position of the shift lever 12 is shown. Method 100 generally checks the first position signal 20 and the second position signal 22 to determine their accuracy and reliability before communicating the associated range selection to the transmission and/or another controller. Method 100 starts at step 102 in which the shift lever 12 is in a position along the shift path 34.

After step 102, method 100 proceeds to step 104. At step 104, the controller 18 receives the first position signal 20 from the first position sensor 14, and the second position signal 22 from the second position sensor 16. As explained above, the first position signal 20 has a first x-coordinate value $x_1$ and a first y-coordinate value $y_1$, and the second position signal 22 has a second x-coordinate value $x_2$ and a second y-coordinate value $y_2$.

After step 104, method 100 proceeds to step 106. At step 106, the controller 18 assigns a first coordinate pair $(x_1, y_1)$, a second coordinate pair $(x_1, y_2)$, a third coordinate pair $(x_2, y_1)$, and a fourth coordinate pair $(x_2, y_2)$.

After step 106, method 100 proceeds to step 108. At step 108, the controller 18 performs a position diagnostic test 200, as depicted in FIG. 5 and described in more detail below, in which the controller 18 analyzes the accuracy of $x_1$, $x_2$, $y_1$, and $y_2$.

Referring now to FIG. 5, the position diagnostic test 200 is shown. The position diagnostic test 200 includes steps 202, 204, 206, and 208 in which the controller 18 performs a rationality test for each of $x_1$, $x_2$, $y_1$, and $y_2$, respectively. It should be appreciated that steps 202, 204, 206, 208 may be performed simultaneously or alternatively in any order. The rationality test generally involves determining if at least one predetermined condition relating to the tested coordinate value exists. If the condition does exist, then the tested coordinate value fails the rationality test.

A first predetermined condition may be that the coordinate pairs containing the tested coordinate value are outside of the shifter gate 36. For example, where $x_1$ is the tested coordinate value, if the first coordinate pair $(x_1, y_1)$ and the second coordinate pair $(x_1, y_2)$ are outside of the shifter gate 36, then $x_1$ fails the rationality test. As explained above, the shifter gate 36 defines an acceptable zone around the shift path 34 within a given tolerance, and is stored in the controller 18.

A second predetermined condition may be that the tested coordinate value and its counterpart coordinate value (i.e., the coordinate value for the same axis not being tested) disagree (i.e., are not within a given tolerance of each other), and the counterpart coordinate value is within the shifter gate 36 and did not have a prior rationality fault leading up to the current rationality test. Continuing with the example above in which $x_1$ is being tested, if $x_1$ and $x_2$ disagree, and $x_2$ is within the shifter gate 36 and did not have a prior rationality fault, then $x_1$ fails the rationality test.

A third predetermined condition may be that the tested coordinate value and its counterpart coordinate value disagree, and the tested coordinate value had a prior rationality fault leading up to the current rationality test. Continuing again with the above example, if $x_1$ and $x_2$ disagree, and $x_1$ had a prior rationality fault, then $x_1$ fails the rationality test.

Referring back to FIG. 4, after step 106, method 100 proceeds to steps 108 and 110. At step 108, the controller 18 determines if both $x_1$ and $y_1$ passed their respective rationality test. If both passed, as indicated by the (+) sign in FIG. 4, then method 100 proceeds to step 112 in which the controller 18 determines that the first position sensor 14 is functional, and that the first position signal 20 is accurate such that it may be used to determine the associated range selection to be communicated to the transmission and/or another controller. On the other hand, if either $x_1$ or $y_1$ failed, as indicated by the (−) sign in FIG. 4, then method 100 proceeds to step 114 in which the controller 18 disregards the first position signal 20.

At step 110, the controller 18 similarly determines if both $x_2$ and $y_2$ passed their respective rationality test. If both passed, as indicated by the (+) sign in FIG. 4, then method 100 proceeds to step 116 in which the controller 18 determines that the second position sensor 16 is functional, and that the second position signal 22 is accurate such that it may be used to determine the associated range selection to be communicated to the transmission and/or another controller. On the other hand, if either $x_2$ or $y_2$ failed, as indicated by the (−) sign in FIG. 4, then method 100 proceeds to step 118 in which the controller 18 disregards the second position signal 22. Method 100 ends at step 120.

Method 100 allows the vehicle to continue to be operated when the first position signal 20 and the second position signal 22 disagree. However, when the controller 18 determines that both the first position signal 20 and the second position signal 22 are inaccurate, the controller 18 may select the Park mode to communicate to the transmission and/or another controller.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A shift-by-wire system for a vehicle comprising:
   a shift lever movable along a shift path between a plurality of range positions arranged in a shift pattern;
   a first position sensor configured to sense a position of the shift lever along the shift path, and to generate a corresponding first position signal having a first x-coordinate value and a first y-coordinate value;
   a second position sensor configured to sense the position of the shift lever along the shift path, and to generate a corresponding second position signal having a second x-coordinate value and a second y-coordinate value; and
   a single controller configured to receive both the first position signal from the first position sensor and the second position signal from the second position sensor, and to determine if at least one of the first position signal and the second position signal accurately communicates the position of the shift lever.

2. The shift-by-wire system of claim 1 wherein the controller is further configured to perform a rationality test on each of a plurality of tested coordinate values that include the first x-coordinate value, the first y-coordinate value, the second-x coordinate value, and the second y-coordinate value, where any one of the tested coordinate values fails the respective rationality test if at least one predetermined condition exists.

3. The shift-by-wire system of claim 2 wherein the at least one predetermined condition is that the tested coordinate value and a counterpart coordinate value do not agree within an acceptable tolerance, and the counterpart coordinate value is within a predetermined tolerance of the shift path and does not have a prior rationality fault, where the first x-coordinate value and the second x-coordinate value are the counterpart coordinate values for each other, and the first y-coordinate value and the second y-coordinate value are the counterpart coordinate values for each other.

4. The shift-by-wire system of claim 2 wherein the at least one predetermined condition is that the tested coordinate value and a counterpart coordinate value do not agree within an acceptable tolerance, and the tested coordinate value has a prior rationality fault, where the first x-coordinate value and the second x-coordinate value are the counterpart coordinate values for each other, and the first y-coordinate value and the second y-coordinate value are the counterpart coordinate values for each other.

5. The shift-by-wire system of claim 2 wherein the controller is further configured to assign a first coordinate pair, a second coordinate pair, a third coordinate pair, and a fourth coordinate pair, where the first coordinate pair is the first position signal, the second coordinate pair includes the first x-coordinate value and the second y-coordinate value, the third coordinate pair includes the second x-coordinate value and the first y-coordinate value, and the fourth coordinate pair is the second coordinate signal.

6. The shift-by-wire system of claim 5 wherein the at least one predetermined condition is that the coordinate pairs containing the tested coordinate value are outside of a predetermined tolerance of the shift path.

7. The shift-by-wire system of claim 2 wherein the controller is further configured to disregard the first position signal if at least one of the tested coordinate values that includes the first x-coordinate value or the first y-coordinate value fails the respective rationality test, and to disregard the second position signal if at least one of the tested coordinate values that includes the second x-coordinate value or the second y-coordinate value fails the respective rationality test.

8. The shift-by-wire system of claim 1 wherein the first position sensor and the second position sensor are oriented at an angle with respect to the shift path such that any movement of the shift lever along the shift path results in a change in both the first x-coordinate value and the first y-coordinate value for the first position signal, and the second x-coordinate value and the second y-coordinate value for the second position signal.

9. A position diagnostic test for a shift-by-wire system having a shift lever movable along a shift path, a first position sensor and a second position sensor configured to each sense a position of the shift lever, and to generate a corresponding first position signal and second position signal, respectively, the first position signal having a first x-coordinate value and a first y-coordinate value, and the second position signal having a second x-coordinate value and a second y-coordinate value, the position diagnostic test comprising performing, by a single controller, a rationality test for each of a plurality of test coordinate values that include the first x-coordinate value, the second x-coordinate value, the first y-coordinate value, and the second y-coordinate value, wherein any one of the tested coordinate values fails the respective rationality test if at least one predetermined condition exists, and the first position signal and the second position signal are both received by the single controller.

10. The position diagnostic test of claim 9 wherein the at least one predetermined condition is that the tested coordinate value and a counterpart coordinate value do not agree within an acceptable tolerance, and the counterpart coordinate value is within a predetermined tolerance of the shift path and does not have a prior rationality fault, where the first x-coordinate value and the second x-coordinate value are the counterpart coordinate values for each other, and the first y-coordinate value and the second y-coordinate value are the counterpart coordinate values for each other.

11. The position diagnostic test of claim 9 wherein the at least one predetermined condition is that the tested coordinate value and a counterpart coordinate value do not agree within an acceptable tolerance, and the tested coordinate value has a prior rationality fault, where the first x-coordinate value and the second x-coordinate value are the counterpart coordinate values for each other, and the first y-coordinate value and the second y-coordinate value are the counterpart coordinate values for each other.

12. The position diagnostic test of claim 9 further comprising assigning a first coordinate pair, a second coordinate pair, a third coordinate pair, and a fourth coordinate pair prior to performing the rationality tests, where the first coordinate pair is the first position signal, the second coordinate pair includes the first x-coordinate value and the second y-coordinate value, the third coordinate pair includes the second x-coordinate value and the first y-coordinate value, and the fourth coordinate pair is the second coordinate signal.

13. The position diagnostic test of claim 12 wherein the at least one predetermined condition is that the coordinate pairs containing the tested coordinate value are not within a predetermined tolerance of the shift path.

14. A method for determining a position of a shift lever of a shift-by-wire system along a shift path, the shift-by-wire system also having a first position sensor and a second position sensor configured to each sense the position of the shift lever, and to generate a corresponding first position signal and second position signal, respectively, the first position signal having a first x-coordinate value and a first y-coordinate value, and the second position signal having a second x-coordinate value and a second y-coordinate value, the method comprising:
- receiving, by a single controller, the first position signal from the first position sensor, and the second position signal from the second position sensor;
- performing, by the controller, a rationality test for each of a plurality of test coordinate values that include the first x-coordinate value, the second x-coordinate value, the first y-coordinate value, and the second y-coordinate value;
- if both of the tested coordinate values that include the first x-coordinate value and the first y-coordinate value pass the respective rationality test, then determining that the first position signal is accurate; and
- if both of the tested coordinate values that include the second x-coordinate value and the second y-coordinate value pass the respective rationality test, then determining that the second position signal is accurate;
- wherein any one of the tested coordinate values does not pass the respective rationality test if at least one predetermined condition exists.

15. The method of claim 14 wherein the at least one predetermined condition is that the tested coordinate value and a counterpart coordinate value do not agree within an acceptable tolerance, and the counterpart coordinate value is within a predetermined tolerance of the shift path and does not have a prior rationality fault, where the first x-coordinate value and the second x-coordinate value are the counterpart coordinate values for each other, and the first y-coordinate value and the second y-coordinate value are the counterpart coordinate values for each other.

16. The method of claim 14 wherein the at least one predetermined condition is that the tested coordinate value and a counterpart coordinate value do not agree within an acceptable tolerance, and the tested coordinate value has a prior rationality fault, where the first x-coordinate value and the second x-coordinate value are the counterpart coordinate values for each other, and the first y-coordinate value and the second y-coordinate value are the counterpart coordinate values for each other.

17. The method of claim 14 further comprising assigning a first coordinate pair, a second coordinate pair, a third coordinate pair, and a fourth coordinate pair prior to performing the rationality tests, where the first coordinate pair is the first position signal, the second coordinate pair includes the first x-coordinate value and the second y-coordinate value, the third coordinate pair includes the second x-coordinate value and the first y-coordinate value, and the fourth coordinate pair is the second coordinate signal.

18. The method of claim 17 wherein the at least one predetermined condition is that the coordinate pairs containing the tested coordinate value are not within a predetermined tolerance of the shift path.

19. The method of claim 14 further comprising determining that the shift-by-wire system should be in a park mode if both the first position signal and the second position signal are disregarded.

* * * * *